United States Patent [19]

Stähle

[11] 4,225,111
[45] Sep. 30, 1980

[54] SOLENOID VALVE

[75] Inventor: Kurt Stähle, Neuhausen, Fed. Rep. of Germany

[73] Assignee: Corcordia Fluidtechnik GmbH, Fed. Rep. of Germany

[21] Appl. No.: 847,810

[22] Filed: Nov. 2, 1977

[30] Foreign Application Priority Data

Nov. 3, 1976 [DE] Fed. Rep. of Germany ....... 2650393
Nov. 3, 1976 [DE] Fed. Rep. of Germany ....... 2650394

[51] Int. Cl.³ ..................... F16K 31/10; F16K 25/00
[52] U.S. Cl. ................................. 251/87; 251/129; 251/333
[58] Field of Search ............... 251/129, 333, 87, 86; 137/242

[56] References Cited

U.S. PATENT DOCUMENTS

| | | | |
|---|---|---|---|
| 2,069,069 | 1/1937 | Horton | 251/86 X |
| 2,596,409 | 5/1952 | Johnson et al. | 251/129 X |
| 2,829,860 | 4/1958 | Garner et al. | 251/129 |
| 3,379,406 | 4/1968 | Greer | 251/333 X |
| 3,468,511 | 9/1969 | Haskins | 251/333 X |
| 3,510,100 | 5/1970 | Makusay et al. | 251/86 X |
| 3,671,009 | 6/1972 | Stampfli | 251/86 X |

FOREIGN PATENT DOCUMENTS

956005 1/1957 Fed. Rep. of Germany ......... 251/333
933330 8/1963 United Kingdom .

*Primary Examiner*—Arnold Rosenthal
*Attorney, Agent, or Firm*—Craig & Antonelli

[57] ABSTRACT

A solenoid valve is provided which includes an axially movable solenoid plunger for moving an elastic diaphragm away from a position engaging an outlet stub of the valve housing. According to one aspect of the invention, the plunger and the diaphragm are connected by way of a wire ring which engages the diaphragm at a position peripherally outside of the engagement of the diaphragm of the outlet stub, whereby the movement of the diaphragm from the closed position is accompanied by a shearing action at the sealing edges, resulting in self-cleaning of the sealing edges. According to another aspect of preferred embodiments of the invention, the sealing element which is movable along with the plunger controlled by the solenoid valve, is connected so as to initially move away from the sealing surfaces at only one side of the sealing element. By initially moving only from one side of the sealing surfaces, the forces required by the solenoid plunger are substantially reduced due to the equalization of pressure which takes place after the initial movement away of the one side of the sealing element.

3 Claims, 7 Drawing Figures

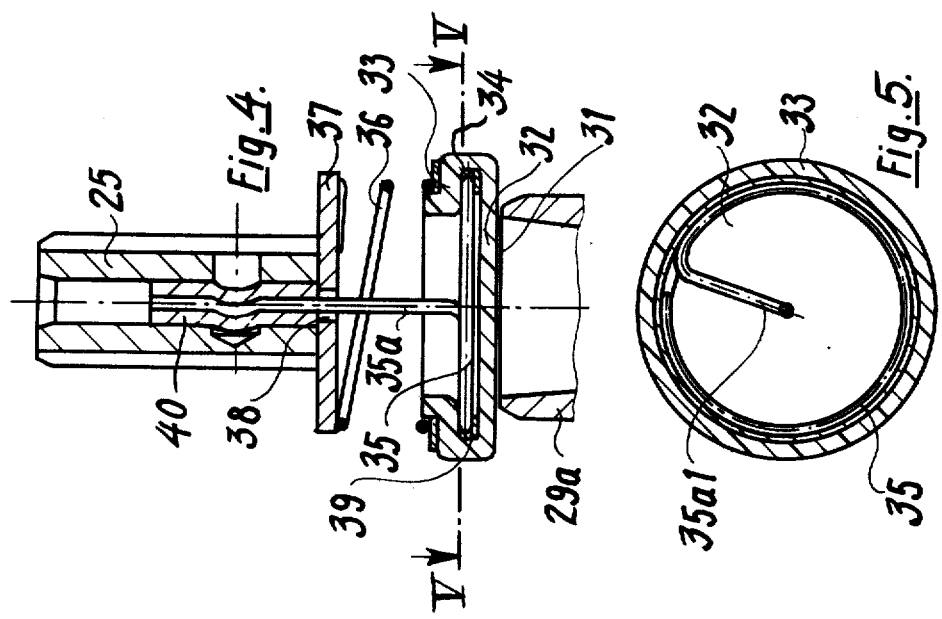
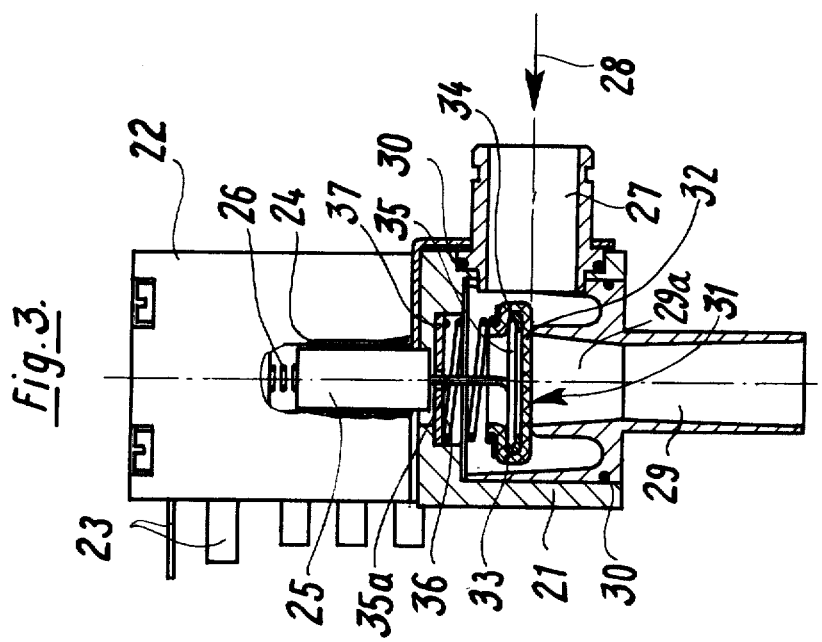

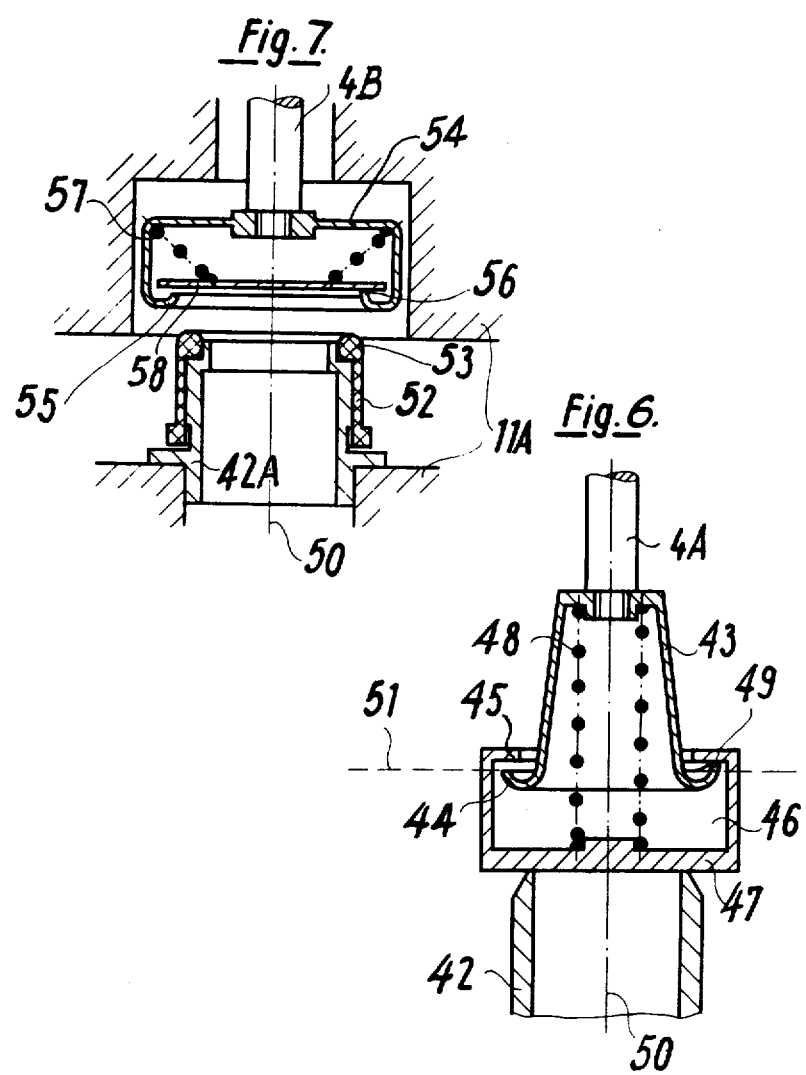

SOLENOID VALVE

BACKGROUND AND SUMMARY OF THE INVENTION

The invention relates to a valve, especially a solenoid valve, with a tappet movable along a valve axis, with a valve seal disposed concentrically on said tappet, and with said seal abutting an associated sealing surface endwise.

Valves of this type are known in various designs. As in solenoid valves, the tappet can be actuated by a magnetically operated plunger, or by a piston, actuated by a pressure medium. Valves of this type, generally designated as flat-seat valves, have the disadvantage that when switching forces increase, i.e., either when the pressure of the medium to be controlled increases or the throughput cross section is increased, either stronger drives are required to control the switching forces, which also entails an increased strength for the valve construction, or additional electrical devices must be provided, the latter also requiring reinforcement of the valve components.

An object of the present invention is to design a valve of the type described hereinabove in such manner that significantly higher pressures or higher throughput cross sections can be controlled by retaining the same dimensions for the drive devices, without costly additional devices being required. The invention attains this object by providing that the valve seal, as a separate component, is held against the tappet by an eccentrically mounted tilting axis and a return spring. By virtue of this design, the valve seal does not lift over the area of the entire seat when the valve opens, but is initially lifted at one side only, so that the driving forces required therefor need be only approximately half as great as those which are conventionally required in previously known valves. When the valve seat is raised slightly at one side, the pressures equalize and the remainder of the opening movement may be accomplished with low driving forces.

In particularly advantageous preferred embodiments of the invention, the valve seal tilting axis and the return spring are in the form of a connecting spring, said connecting spring having at least one spring arm extending radially with respect to the valve axis and a loop connected therewith, whereby each of these two parts is attached to one of the components to be connected with one another. This design allows a very simple and inexpensive construction.

The connecting spring is provided with two loops arranged symmetrically with respect to the spring arm, said loops being gripped in grooves in the valve seal in one preferred embodiment. In this embodiment, the tappet is preferably advantageously provided with a guide surface for the valve seal, against which the valve seal is pressed by the connecting spring. This design makes it possible to achieve simple but effective guidance of the valve seal relative to the seat in a relatively simple fashion, without losing the advantageous effect when the valve seal is raised.

In a very simple preferred embodiment, the connecting spring is a loop spring formed in one piece from a spring wire, the loop fitting the circumference of the valve seal being gripped in such manner that it snaps into the groove in the valve seal. This design also allows a very simple installation of the valve seal on the tappet, since it is sufficient to push the snap spring through both parts. In order to facilitate this assembly step, the ends of the loops can be bent outward.

In order to mount the snap spring reliably on the tappet, the spring arm extends between the loops, said arm consisting of two wire loops arranged parallel to one another which are held on the tappet by a locking plug. The locking plug is inserted centrally into the recess in a collar, said collar being mounted on the tappet and being provided with the guide surface for the valve seal. The collar has an opening extending diametrically through it, in which the spring arm is firmly gripped. This collar can be screwed onto the tappet, so that the manufacture of this part poses no difficulty whatever. Naturally, the valve seal must also be provided with a diametrally extending opening, whose cross section must be selected so that sufficient play for movement is provided for the unilateral (initial lifting at one side) lifting movement.

The invention can also be implemented in a quite different embodiment, wherein the loops of the connecting spring form a wire ring connected with the tappet, said ring fitting from the inside into a groove in a diaphragm which is used as the valve seal, tensioning said diaphragm. This design is very simple to implement and is suitable for a large number of applications, especially for controlling liquids containing calcium, because the utilization of the tensioned diaphragm allows calcium deposits on the diaphragm and the tensioning guide parts to be avoided. The wire ring is preferably made integral with the return spring arm, said arm being guided in turn to a plunger forming the tappet and being fastened thereto, whereby the diaphragm can also be pressed by a compression spring against the sealing surface. This embodiment also has the considerable advantage that the switching forces that must be applied, by comparison with previously known valves, may be kept low, despite the higher pressures of the medium to be controlled or increased throughput cross sections.

With respect to the embodiment referred to above for controlling liquid containing calcium, hereinafter the "self-cleaning embodiment", it is noted that solenoid valves are known which are also used for controlling fluids which have a high calcium content. When conventional plunger valves are used under these conditions, wherein a sealing element fits into a matching valve seat and is controlled by the energization of an electromagnet, the danger arises (especially after a prolonged operating period) that the valve becomes leaky, because deposits such as calcium deposits are formed in the sealing area which prevent smooth functioning. These disadvantageous phenomena occur in particular in solenoid valves in coffee makers, water heaters, washing machines, and the like.

Diaphragm valves are also known wherein a diaphragm mounted in a housing separates the housing chamber in which the plunger drive is located from the flow chamber. The diaphragm is pressed against the edge of a valve seat by the movement of the plunger. These features have the advantage that they do not exhibit such a rapid tendency to develop calcium deposits in the vicinity of the moving diaphragm, but do suffer from the considerable disadvantage that the diaphragm must be tensioned against the water pressure. This requires either high tensioning pressures which make powerful magnetic forces necessary, or there will be a danger of the diaphragm opening as a result of pressure fluctuations in the medium being controlled.

Therefore, a further object of the self-cleaning embodiments of the present invention is to provide a solenoid valve which is especially suited for controlling fluids containing calcium, and is therefore designed in such fashion that deposition of calcium is largely avoided, but which is relatively simple in construction so that it may be employed economically.

The invention contemplates attainment of this further object in this self-cleaning embodiment by making the sealing element in the form of a diaphragm or the like cooperating with the end of an outlet stub projecting into a valve housing with the sealing element mounted in a holder which extends outside the sealing outline of the outlet stub and with the holder being connected to a movable plunger. This design ensures that a certain shearing effect takes place between the membrane and the sealing edge during each sealing process, because the diaphragm is pulled outward from its mount over the sealing edge (due to the holder extending peripherally outside the sealing outline of the outlet stub). The diaphragm need not be moved against the water pressure to the closing position so that low magnetic forces will suffice to actuate the valve. Nevertheless, a self-cleaning valve is produced which is particularly applicable for controlling liquids containing calcium.

It is advantageous according to particularly preferred self-cleaning embodiments of the invention to have the connection between the diaphragm and the solenoid plunger in the form of the wire ring, because this ensures a very inexpensive yet very effective design. This wire ring is preferably mounted in the groove formed by a projecting edge of the pot-shaped diaphragm, so that separate fastening devices are unnecessary. In this especially advantageous embodiment, this wire ring is made from a wire shaped into a loop, one end of which is bent radially with respect to the center of the ring and then bent toward the plunger, so that a single piece of wire connects the plunger to the diaphragm. This design also has the advantage that relativey thin wires can be used which are subjected to certain vibrations during each switching process, so that calcium deposits on these parts are also largely avoided. If the end of the wire is bent toward the center from the circumference of the loop in the plane of the loop, it is advantageous to install a twisted ring as a spacer between the diaphragm and the wire ring, so that the connecting wire to the plunger does not contact the surface of the diaphragm during the switching process.

In order to ensure sufficient sealing force in this self-cleaning embodiment, the edge of the diaphragm is preferably pressed by a compression spring against the end of the outlet stub, said compression spring having its other end abutting the other side of the housing. The plunger than operates against the action of this compression spring as the valve opens. This compression spring need not be made very strong because the diaphragm is also subject to the pressure from the fluid being controlled and is pressed against the seat when in the closed position. The compression spring can, however, exert a certain guiding effect, so that it will suffice to make the connection with the plunger consist only of the thin wire section mentioned above.

This preferred self-cleaning embodiment of the invention provides a highly advantageous possibility for preventing calcium deposition in the vicinity of the plunger, by virtue of the fact that the compression spring abuts the housing with a disk interposed, said disk leaving only a small opening through which the wire to the plunger passes, and otherwise separates the valve chamber in the housing from the operating chamber of the plunger. In the operating chamber of the plunger, therefore, a volume of fluid is moved about which corresponds to the small volume of the wire which is submerged. There is substantially no additional exchange with the fluid chamber which contains the calcium. In this manner, the tendency toward calcium deposition may be reduced, whereby this design feature is also contemplated for use in valves which do not have a diaphragm as a sealing element, according to other preferred embodiments.

Yet another advantageous preferred embodiment of the invention is contemplated which provides that the valve seal consists of an elastically flexible plate, said plate being held against the tappet by fastening elements, said elements projecting at least at one point on the circumference of the plate, out of the plane radial to the tappet axis in the direction of the tappet, in which the other contact points of the fastening elements are disposed on the edge of the plate. This results in an advantageous embodiment if the plate is part of a cap articulated with its open end on the tappet and the fastening elements are in the form of a ring which grips behind a bead on the edge of the cap, said ring being bent outward at one point, upward toward the tappet. In this embodiment also, an eccentric lifting action is created when the valve seal is raised, so that the same advantages may be obtained as were listed above.

For small specified widths and limited available space in the valve body, an embodiment is particularly to be recommended in which the ring of the outwardly turned-over edge is a bushing attached to the closed end of the tappet. The bushing can then accept a compression spring in its interior, said spring abutting the closed side of the elastic cap. For large specified widths, a valve seal can be obtained very simply if the plate is a valve plate gripped elastically at the lower edge of a bushing. This valve plate can either be made elastic itself or may be pressed against an elastic seal by a compression spring according to alternative contemplated embodiments, said seal forming the seat on an outlet stub. An advantageous embodiment is ensured if the lower edge of the bushing is provided with an inwardly directed collar, against which the valve plate rests, and if the collar is elevated at one point to a greater extent relative to the closed part of the bushing. The raised part will then lift the valve plate unilaterally (from one side) as it rises, and the advantageous effects set forth above will be achieved despite the simplicity of the design.

Embodiments of the invention are also contemplated, wherein, instead of the inwardly directed collar of a bushing, pluralities of claws uniformly distributed around the circumference are provided, at least one of which claws is bent upward more than the others. In both cases, a compression spring acting on the valve plate is advantageously disposed inside the bushing, said spring forming the non-positive connection between the components.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 3 is a schematic cross sectional view through a solenoid valve designed as a corner valve, and constructed in accordance with a second preferred embodiment of the present invention;

FIG. 4 shows certain operating parts of the valve shown in FIG. 3 on an enlarged scale;

FIG. 5 is a cross section through the diaphragm element of FIG. 4 along plane V—V.

FIG. 6 is a partial cross sectional view through a valve seal constructed in accordance with yet another embodiment of the invention; and FIG. 7 is a partial cross sectional view similar to FIG. 6 through still another embodiment of a valve seal constructed in accordance with the present invention.

DETAILED DESCRIPTION OF THE DRAWINGS

Figure 1:
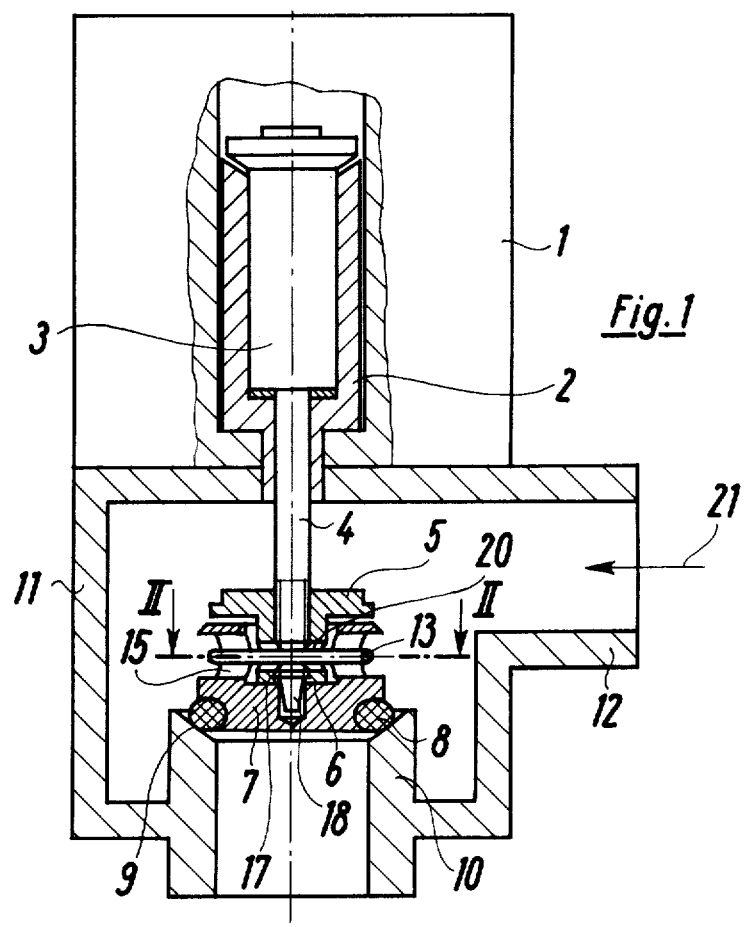
FIG. 1 is a schematic cross sectional view through a first preferred embodiment of a valve designed as a cover valve and constructed according to the present invention.

FIG. 1 shows a solenoid valve whose electromagnet part 1 is provided with a coil, not shown, which may be energized. A plunger 3 is guided in a guide bushing 2 inside solenoid valve part 1, said plunger 3 being made of magnetically effective material and being connected with a tappet 4, to the lower end of which a collar 5 is screwed. Collar 5 is provided with a downwardly pointing plug, whose lower end face 6 constitutes a guide surface for a valve seal body 7. Valve seal body 7 rests in a sealing manner with an O-ring 8 on a sealing surface 9 of a stub 10, which surface 9 is slightly tapered conically inward. Stub 10 forms the outlet stub from a valve housing 11, into which the influx is via stub 12. Valve housing 11 is connected in known fashion with magnet part 1.

Valve seal body 7 is connected with tappet 4 in such manner that a loop spring 13 formed from spring wire with two loops 14 fit in a groove 15 on the valve seal body 7 and is firmly held therein. Loop spring 13 is provided with a central spring arm 16, said arm 16 being designed so that the spring wire used to manufacture spring 13 is guided in two mutually parallel loops. This spring arm 16 fits through the recess of collar 5 and, in the embodiment shown, is held firmly in collar 5 and on tappet 4 by the ends of tappet 4 and the upper end of a stop plug 17. Stop plug 17 has a conical centering tip 18, which fits into a corresponding hole in the center of valve seal body 7, thus centering the valve seal body 7 in the position shown. The through opening 19 provided in the valve seal body 7 for spring arm 16 of loop spring 13 is much larger than the dimensions of the spring arm, so that sufficient play is provided for the part of the spring arm 16 which is elastically deformed during the lifting process. Bore 20 in collar 5 on the other hand is disposed so that spring arm 16 is firmly gripped in bore 20. This design has the advantage that the valve seal body 7 can be raised very easily from the indicated position, in which through flow in the direction of arrow 21 is not possible, even if the pressure existing inside housing 11 is very high or the throughput cross section through outflow stub 10 is large. This is explained below by the manner of operation.

Figure 2:
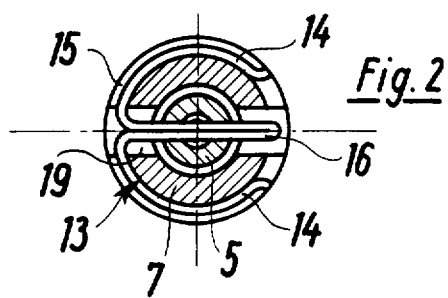
FIG. 2 is a cross sectional view through the valve shown in FIG. 1 along line II—II.

When the magnet part of the valve is energized, plunger 3 is pulled upward out of the position indicated, pulling with it collar 5 and spring arm 16 of loop spring 13 upward. Since loop spring 13 produces a connection between spring arm 16 and loops 14, which are gripped on valve seal 7 only on the left side as shown in FIGS. 1 and 2. Valve seal 7 is raised initially at its left side when the magnet part is energized, but remains in contact with the right side of valve seat 9. Valve seal 7 is therefore equipped with an effective tilting axis, said tilting axis running eccentrically with respect to the valve axis, the latter (valve axis) being provided by the axis of tappet 4. The releasing forces are therefore much lower than in the case in which the entire valve seat 7 must be raised upward parallel to the valve axis from seat 9. In the latter case (without the tilting provided by the present invention) the entire force which is produced by the pressure of the medium located in chamber 11 as well as the contact surface of valve seal body 7 must be overcome. This force can be approximately halved by the design according to the invention, so that much higher pressures may be controlled with the same valve arrangement, or larger throughput cross sections may be handled at the same pressure. If one side of valve seal body 7 is raised initially, the pressure in outlet stub 10 and housing 11 will equalize, thus allowing valve seal body 7 to be raised further without any difficulty. The spring force of loop spring 13 will then be sufficient, said force raising valve seal 7 over return-spring loop 14 upward, and centering it so that it rests against guide surface 6. The closing movement is accomplished in simple fashion by virtue of the face that the magnet part is de-energized so that tappet 4 is pushed downward by plunger 3, possibly still supported by spring forces, until O-ring 8 comes to rest exactly on valve seat 9, because valve seal 7 is held centrally by the conical pin 18 of stop plug 17.

The new valve also has the considerable advantage that a relatively simple assembly is made possible. For this purpose it is sufficient, after screwing collar 5 on tappet 4, to mount valve seal body 7 with the aid of centering pin 18 (centering pin 18 being detachably attached to the lower end of tappet 4 by a threaded connector or the like), whereupon loop spring 13 can be pushed onto the valve seal body 7 laterally by bending loop 14, while simultaneously introducing spring arm 16 into opening 20 in collar 5. In order to facilitate this sliding-on process, the outermost ends of loops 14 are bent slightly outward.

It is also contemplated by another embodiment of the invention to implement a design such that spring arm 16 is fastened directly to tappet 4 and loop 14 is inserted into an outer groove on sealing part 7, said groove being further down than the bore for spring arm 16. In this embodiment, valve seal body 7 can rest against the lower end of tappet 4 with its upper edge, and need not fit in a sleeve-like fashion around the tappet. An embodiment of this kind is particularly suited for small specified widths of the opening being sealed.

Another embodiment of the invention is shown in FIGS. 3 and 5. In FIG. 3, a valve housing 21 is connected with a solenoid part 22, provided with push-on terminals 23. The solenoid part 22 comprises an electromagnetic coil, not shown, within which a guide tube 24 is provided for plunger 25. Plunger 25 is made of magnetically active material and is forced out of the vicinity of the coil by a compression spring 26, when the coil is not energized.

Two stubs are provided in valve housing 21, one of which enters from the side and is the inlet stub 27, through which liquid flows in the direction of arrow 28 when the valve is open. An outlet stub 29 is inserted from below into housing 21, whereby the design is made so that both outlet stub 29 and inlet stub 27 are provided with cylindrical shoulders which are pushed into corresponding openings in housing 21 and sealed from housing 21 by O-rings 30. Outlet stub 29 is provided with a stub part 29a projecting into the interior of housing 21, the upper end 31 of said stub part 29a being provided with a circumferential sealing edge. When the valve is in the closed state, an elastic diaphragm 32 rests on this end 31, said diaphragm being made of rubber in the illustrated embodiment. The diaphragm 32 is approximately in the shape of a pot and has a projecting edge 33 in which a groove 34 is formed, said groove accepting a wire ring 35. The wire ring 35, as shown in detail in FIGS. 4 and 5, is made of a wire loop whose free end 35a is guided first toward the center of ring 35 (in the plane of the groove 34) and then upward to plunger 25. The upper part 35a of wire ring 35 is mounted in a bore in plunger 25 as shown in FIG. 4.

A compression spring 36 rests upon the outer (upwardly facing) edge of projecting collar edge portion 33 of diaphragm 32, said spring 36 pushing diaphragm 32 toward the end 31 of stub 29 when diaphragm 32 is in the position indicated. The other end of compression spring 36 abuts housing 21 through the intermediary of a disk 37 (see also FIG. 4), said disk having in its center only a very small opening 38 to allow part 35a of wire ring 35 to pass through. As shown in FIG. 4, the end 35a of wire ring 35 is gripped (by detent bent portions) in hollow plunger 25 within a sleeve 40, said sleeve being gripped in plunger 25 (by detent abutments as shown) together with the free wire end 35a. Plunger 25 itself, as is known, is provided with axially disposed recesses at its circumference, which allow the fluid volumes compressed by its actuation to flow past.

The design shown in FIGS. 3 to 5 has the advantage that diaphragm 32 need not be actuated against the pressure of the liquid being controlled because it itself is subject to the pressure of the liquid on the side which is away from the outlet stub 29. It opens when magnet part 22 is energized by virtue of the fact that plunger 25 is pulled upward. Plunger 25 itself is largely protected from calcium deposition by virtue of the fact that disk 37 largely separates the actuating chamber of plunger 25 from the control chamber in housing 21. Exchange of the liquid in the plunger chamber with the liquid to be controlled is possible only through the small opening 38, and this involves only the exchange of a volume of liquid which corresponds to the volume of the submerged wire section 35a. Since this volume is very small because of the thinness of wire 35, this design ensures considerable protection against any influence upon the functioning ability of plunger 25.

Diaphragm 32 itself, as is clearly shown in the drawings, is gripped outside the perimeter of sealing surfaces 31 at the perimeter of ring 35, said ring 35 accepting only a small twisted ring 39 between itself and the diaphragm 32 in the embodiment shown, said twisted ring 39 ensuring that the part 35a1 which is bent radially with respect to the center of diaphragm 32 (FIG. 5) does not come in contact with diaphragm 32. This design ensures that when the valve closes the diaphragm 32 is pulled outward in an annular fashion around sealing edge 31 under the influence of compression spring 36 and the action of the compressed fluid itself, and is therefore subject to certain vibrations. Therefore, there is a definite shearing action between sealing edge 31 and diaphragm surface 32 during each switching process, said shearing action resulting in a self-cleaning effect on the sealing edges of outlet stub part 29a. Diaphragm surface 32 itself is largely protected from calcium deposition by the movement of the surface itself which occurs during each switching process. This also applies to wire loop 35 and connecting part 35a, since certain vibrations occur at this point during the switching process which result in a cleaning effect. The new valve is therefore especially suitable for controlling liquids containing calcium, but naturally can also be used for controlling other liquids or media, where similar deposition problems occur.

Comparing this embodiment, FIGS. 3-5, with the embodiment of FIGS. 1 and 2, spring arm 16 in FIGS. 1 and 2 is not connected separately with a tappet, but the radially bent part 35a1 of loop spring 35 which serves as a connection is bent down in a part 35a which replaces the tappet and is connected directly with plunger 25. The loops 14 in FIGS. 1 and 2 are converted in the embodiment shown in FIGS. 3-5 into a wire ring 35, said ring, however, not being closed at point P (FIG. 5), so that parts 35a, 35a1 and 35 can be made from a single piece of spring wire. Diaphragm 32 is tensioned externally around wire ring 35, said diaphragm 32 accepting wire ring 35 in groove 34, in which twisted ring 39 is also disposed. Compression spring 36 presses against the upper surface of diaphragm 32, on which the latter is provided with collar portion 33, said spring 36 abutting the valve housing through the intermediary of the disk 37. Diaphragm 32 rests flat in a sealing manner on the upper end 29a, 31 of the outlet stub when the valve is closed. In this embodiment of FIGS. 3-5 as well, the sealing pressure is therefore effected by the pressure in the valve housing, not shown, said pressure pressing diaphragm 32 against the outlet stub. When plunger 25 is pulled upward by the energizing of an electromagnet, diaphragm 32 is lifted unilaterally (from one side at the position adjacent gap P where part 35a1 extends radially inwardly) in this case in such manner that the action of part 35a of the wire spring is transmitted by spring arm 35a1 to wire ring 35, said ring 35 therefore being raised initially only at the point at which spring arm 35a1 is connected to it. In this embodiment as well, the advantage of much smaller switching forces, already described previously, is provided. The diaphragm can then be raised completely under the spring action of wire ring 35, when the pressure between the interior of outlet stub and the pressure chamber has been equalized.

FIG. 6 shows an embodiment of a valve seal with a different construction, said seal being capable of being installed in a valve housing, not shown, said housing having essentially the same construction as that shown in FIG. 1. In FIG. 6, a bushing 43, open at the bottom, is disposed on tappet 4A, said bushing itself being fastened to tappet 4A, for example by being screwed to the end. Bushing 43 is provided at its lower, open end, with an edge 44, turned over outward, said edge 44 fitting behind a bead 45 of a cap 46, said cap 46 being placed around bushing 43 and having the actual flat valve sealing plate 47 on its closed end. Cap 46 is preferably made of elastic material, so that it can rest in a sealing manner under the action of the compression spring 48 disposed inside the bushing, against the upper end of an outlet stub 42. Embodiments are also contemplated with the seal disposed against the end of the outlet stub, so that the valve sealing plate 47 need not necessarily be made elastic. A design of this type is shown in FIG. 7.

It is important as far as FIG. 6 is concerned for the turned-over edge 44 to be provided at point 49 with an upwardly directed lifting surface 49, said surface projecting upward from the plane 51 which is perpendicular with respect to valve axis 50 and is indicated by a shaded area, toward the tappet, in which bead 44 is also received by its upper edge. In this design as well, cap 46 with valve sealng plate 47 seals the upper end of outlet stub 42, under the action of compression spring 48. When the valve is opened, projection 49 initially grips bead 45 of cap 46, raising cap 46 eccentrically from its seat. Hence, the same advantageous effects are achieved as in the other embodiments.

FIG. 7 shows a variation in which the sealing element, in the form of a sealing ring 52 expanding upward, is mounted externally on outlet stub 42A, said stub having no sealing end surface in this case. The sealing action is taken over by the annular bead 53 of sealing ring 52, which must consist of elastic material for this purpose. As in the embodiment shown in FIG. 6, a bushing 54 is disposed on valve tappet 4B, said bushing in this case, however, having no outwardly turned-over edge, but being provided with a beaded edge 55 which is drawn inward. As in the embodiment shown in FIG. 6, this beaded edge is provided with a raised projection 56, which extends above the plane in the direction of valve tappet 4B, which is formed by the upper edge of beaded edge 55 and which is located perpendicular to valve axis 50. A compression spring 57 is again provided inside bushing 54, said spring being made wider, however, and having its upper side correspond approximately to the diameter of bushing 54. This compression spring 57, which tapers conically downward, presses against the plate 58, which in this embodiment can be made of sheet metal and need not be elastic, because it cooperates with elastic sealing element 53, 52. In this embodiment as well, the advantageous effect is achieved that when the valve seal, shown in the open position in FIG. 7, is raised, projection 56 initially lifts plate 49 unilaterally away from ring 53, so that the valve seal is opened eccentrically with all of the advantages mentioned hereinabove. The embodiment shown in FIG. 7 is suited in particular for considerable specified widths, since no difficulties are involved in dimensioning elastic sealing elements like ring 52 in an appropriately large size and providing flat plate 58. Maintenance of very close tolerances is also unnecessary. The embodiment shown in FIG. 6, on the other hand is specifically suited for small specified widths, and is always advantageous when only a very small amount of space is available in the valve housing.

Embodiments are also comtemplated, wherein the circumferential edge 34 or 45 in FIGS. 6 and 7 is replaced by a plurality, at least three, of individual claws, at least one of which is bent further upward than the others. In the embodiment too, which is simpler particularly as far as assembly is concerned, the same effect is produced.

In particularly preferred arrangements of the embodiment of FIGS. 3–5, the radius of the wire ring 35 is 1.1 to 1.5 times the radius of the open upper end 31 of the stub part 29a. In a particularly preferred embodiment, the radius of the wire ring 35 is 1.35 times the radius of the upper end 31 of said tube part 29a. For practicing the "self-cleaning" aspects of the invention of the embodiment of FIGS. 3–5, the region of the diaphragm which engages directly at the valve seat portion 31 should be sufficiently elastic so as to accommodate the "shearing" effect, with particularly preferred embodiments utilizing diaphragm material having an elasticity comparable to that of rubber. The material of the wire ring 35 should be made of a spring wire.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. Solenoid valve apparatus comprising:

valve chamber housing means, fluid inlet means opening into said housing means, fluid outlet means leading away from said housing means, said fluid outlet means including a fluid outlet stub having an open end facing into said housing means, said open end forming a valve seat with a valve seat sealing edge around the periphery thereof, sealing engagement means selectively engageable with said valve seat to control flow of fluid from said housing means into said fluid outlet stub, plunger means, plunger moving means for forcibly moving said plunger in a predetermined path with respect to said valve seat, connecting means interposed between said plunger means and said sealing element means for moving said sealing element means in dependence on the position of the plunger means, and compression spring means interposed between said sealing element means and one of said housing means and said plunger means for biasing said sealing element means in the direction of the valve seat, wherein said connecting means includes abutment means engageable with said sealing element means for effecting initial movement of only one side of said sealing element means away from said valve seat during opening of said valve, whereby the forces required to be applied by said plunger moving means are minimized due to the aid of a pressure build up on said sealing element means upon said initial movement of said only one side, wherein the sealing element means is an elastic plate part of an elastic cap articulated with an open end to the plunger means, said elastic plate part being held against the plunger means by fastening elements, said fastening elements projecting at at least one point on a circumferential edge of the elastic plate part from the plane extending radially to the axis of the plunger means in the direction of the plunger means, wherein other points of attachment of the fastening elements are disposed on an edge of the elastic plate part, and wherein the fastening elements are made in the form of a ring which grips behind a bead at the edge of the cap, said ring being bent outward and upward toward the plunger means at a point.

2. Valve apparatus according to claim 1, wherein the ring on an outwardly turned edge is a bushing attached to the closed end at the plunger means.

3. Valve apparatus according to claim 2, wherein the bushing accepts a compression spring of the compression spring means within itself, said compression spring abutting the closed side of the elastic cap which forms the plate.

* * * * *